(12) United States Patent
Shikida et al.

(10) Patent No.: US 11,418,227 B2
(45) Date of Patent: Aug. 16, 2022

(54) RADIO APPARATUS, SIGNAL DETECTION METHOD, NON-TRANSITORY COMPUTER READABLE MEDIUM, AND RADIO COMMUNICATION SYSTEM

(71) Applicant: NEC Corporation, Tokyo (JP)

(72) Inventors: Jun Shikida, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/282,469

(22) PCT Filed: Aug. 27, 2019

(86) PCT No.: PCT/JP2019/033483
§ 371 (c)(1),
(2) Date: Apr. 2, 2021

(87) PCT Pub. No.: WO2020/075405
PCT Pub. Date: Apr. 16, 2020

(65) Prior Publication Data
US 2021/0384930 A1    Dec. 9, 2021

(30) Foreign Application Priority Data

Oct. 12, 2018 (JP) .............................. JP2018-193192

(51) Int. Cl.
*H04B 1/10* (2006.01)
*H04B 7/0456* (2017.01)
(Continued)

(52) U.S. Cl.
CPC ............. *H04B 1/10* (2013.01); *H04B 7/0456* (2013.01); *H04B 7/0634* (2013.01); *H04B 7/10* (2013.01); *H04L 25/0202* (2013.01)

(58) Field of Classification Search
CPC ....................................................... H04B 1/10
See application file for complete search history.

(56) References Cited

U.S. PATENT DOCUMENTS

| 2006/0094373 | A1* | 5/2006 | Hottinen | ................ H04B 7/066 455/562.1 |
| 2012/0229336 | A1* | 9/2012 | Koichi | ................. H01Q 3/2658 342/373 |
| 2017/0332364 | A1 | 11/2017 | Sano et al. | |

FOREIGN PATENT DOCUMENTS

| CN | 106291453 A * | 1/2017 | ............... G01S 3/14 |
| JP | 2013-197671 A | 9/2013 | |
| WO | 2016/088719 A1 | 6/2016 | |

OTHER PUBLICATIONS

International Search Report for PCT Application No. PCT/JP2019/033483, dated Nov. 26, 2019.

(Continued)

*Primary Examiner* — Hsinchun Liao
(74) *Attorney, Agent, or Firm* — Sughrue Mion, PLLC

(57) ABSTRACT

A radio apparatus capable of reducing the amount of calculation required to suppress an interference signal is provided. A radio apparatus (1) includes a spatial transformation unit (2) configured to perform a spatial transformation on a received signal including a desired signal and an interference signal received by a plurality of antennas, and thereby calculate a first beam-space received signal vector, a beam selecting unit (3) configured to select at least two elements from the first beam-space received signal vector and generate a second beam-space received signal vector, and an interference suppression synthesis unit (4) configured to estimate a covariance matrix of an interference noise signal including a noise signal and the interference signal included in the second beam-space received signal vector, generate a reception weight by using this covariance matrix, and detect the desired signal based on the reception weight and the second beam-space received signal vector.

13 Claims, 10 Drawing Sheets

(51) Int. Cl.
　　　H04B 7/06　　　　(2006.01)
　　　H04B 7/10　　　　(2017.01)
　　　H04L 25/02　　　 (2006.01)

(56)　　　　　　References Cited

OTHER PUBLICATIONS

3GPP TR36.884 V13.1.0 (Sep. 2016).
Shikida, Jun et al., "Beam Space Channel Estimation Using Multiple DFT Matrices for Massive MIMO Systems", IEICE technical report, vol. 117, No. 456, pp. 405-410, Feb. 21, 2018, Japan.
Shikida, Jun et al., "Uplink Transmission Performance Applying Beam Space Channel Estimation to Massive MIMO Systems", IEICE technical report, vol. 117, No. 456, pp. 399-404, Feb. 21, 2018, Japan.
Taylor, Robert M. Jr. et al., "A Novel Synchronization, Channel Estimation, and Frequency Domain Multichannel Equalization Technique for Single-Carrier MIMO Systems", ICCCE 2006, May 11, 2006.
Thiele, Lars et al., "On the Value of Synchronous Downlink MIMO-OFDMA Systems with Linear Equalizers", IEEE ISWCS 2008, 2008, pp. 428-432.
Xiong, Xin et al., "Beam-Domain Channel Estimation for FDD Massive MIMO Systems With Optimal Thresholds", IEEE Transactions on Wireless Communications, May 10, 2017, vol. 16, issue. 7, Jul. 2017, pp. 4669-4682.

* cited by examiner

RADIO APPARATUS, SIGNAL DETECTION METHOD, NON-TRANSITORY COMPUTER READABLE MEDIUM, AND RADIO COMMUNICATION SYSTEM

This application is a National Stage Entry of PCT/JP2019/033483 filed on Aug. 27, 2019, which claims priority from Japanese Patent Application 2018-193192 filed on Oct. 12, 2018, the contents of all of which are incorporated herein by reference, in their entirety.

TECHNICAL FIELD

The present disclosure relates to a radio apparatus, a signal detection method, a non-transitory computer readable media, and a radio communication system.

BACKGROUND ART

In a radio communication system such as LTE (Long Term Evolution) or a wireless LAN (Local Area Network), a communication area is formed by arranging a plurality of radio apparatuses such as base stations for mobile phones and access points. When adjacent radio apparatuses are operated at the same frequency, interference may occur in one of the adjacent radio apparatuses due to a signal transmitted to the other of the adjacent radio apparatuses, so that communication quality may deteriorate. For example, in the case of an uplink through which data is transmitted from a radio terminal to a radio apparatus, as a signal transmitted by the radio terminal reaches another radio apparatus other than the radio apparatus with which the radio terminal is communicating, the signal causes interference for communication performed by the other radio apparatus and hence the communication quality in the other radio apparatus may deteriorate. Therefore, a technique for lowering interference in an uplink has been studied (e.g., Patent Literature 1).

Patent Literature 1 discloses a method for lowering interference in an uplink. Patent Literature 1 discloses that a base station estimates a propagation-path response (a channel response) to a radio terminal that is communicating with another base station, and suppresses or removes interference from the radio terminal communicating with the other base station by using the estimated value of the propagation-path response.

Further, Non-patent Literature 1 has been known as a related technique for suppressing interference in an uplink. Non-patent Literature 1 discloses an MMSE-IRC (Minimum Mean Square Error Interference Rejection Combining) method as a method for suppressing interference in an uplink. In the MMSE-IRC method, a covariance matrix of an interference noise signal in which an interference signal and a noise signal are added (a covariance matrix of the sum of the interference signal and the noise signal) is estimated, and the interference signal is suppressed by multiplying a received signal by a reception weight generated by using the estimated value of the covariance matrix. That is, when the MMSE-IRC method is used, the interference signal can be suppressed without estimating the channel response to the interference signal.

CITATION LIST

Patent Literature

Patent Literature 1: International Patent Publication No. WO2016/088719

Non Patent Literature

Non-patent Literature 1: 3GPP TR36.884 V13.1.0 (2016-09)

SUMMARY OF INVENTION

Technical Problem

When the method disclosed in Non-patent Literature 1 is used, it is necessary to perform inverse matrix calculation on a matrix having the same number of dimensions as the number of antennas of the radio apparatus in order to generate the reception weight for suppressing the interference signal. In general, the amount of calculation of inverse matrix calculation is in proportion to the cube of the number of dimensions of the matrix on which the calculation is performed. Therefore, in the case where the number of antennas of a radio apparatus is large as in the case of the Massive MIMO (Multiple Input Multiple Output) which has been studied in recent years, the amount of calculation required to suppress the interference signal increases enormously.

The present disclosure has been made to solve the above-described problem and one of the objects thereof is to provide a radio apparatus, a signal detection method, a non-transitory computer readable medium, and a radio communication system capable of reducing the amount of calculation required to suppress an interference signal.

Solution to Problem

A radio apparatus according to the present disclosure includes:

a spatial transformation unit configured to perform a spatial transformation on a received signal including a desired signal and an interference signal received by a plurality of antennas, and thereby calculate a first beam-space received signal vector;

a beam selecting unit configured to select at least two elements from the first beam-space received signal vector and generate a second beam-space received signal vector; and an interference suppression synthesis unit configured to estimate a covariance matrix of an interference noise signal including a noise signal and the interference signal included in the second beam-space received signal vector, generate a reception weight by using this covariance matrix, and detect the desired signal based on the reception weight and the second beam-space received signal vector.

A signal detection method according to the present disclosure includes:

performing a spatial transformation on a received signal including a desired signal and an interference signal received by a plurality of antennas, and thereby calculating a first beam-space received signal vector;

selecting at least two elements from the first beam-space received signal vector and generating a second beam-space received signal vector; and estimating a covariance matrix of an interference noise signal including a noise signal and the interference signal included in the second beam-space received signal vector, generating a reception weight by using this covariance matrix, and detecting the desired signal based on the reception weight and the second beam-space received signal vector.

Advantageous Effects of Invention

According to the present disclosure, it is possible to provide a radio apparatus, a signal detection method, a non-transitory computer readable medium, and a radio communication system capable of reducing the amount of calculation required to suppress an interference signal.

DESCRIPTION OF EMBODIMENTS

Figure 1:
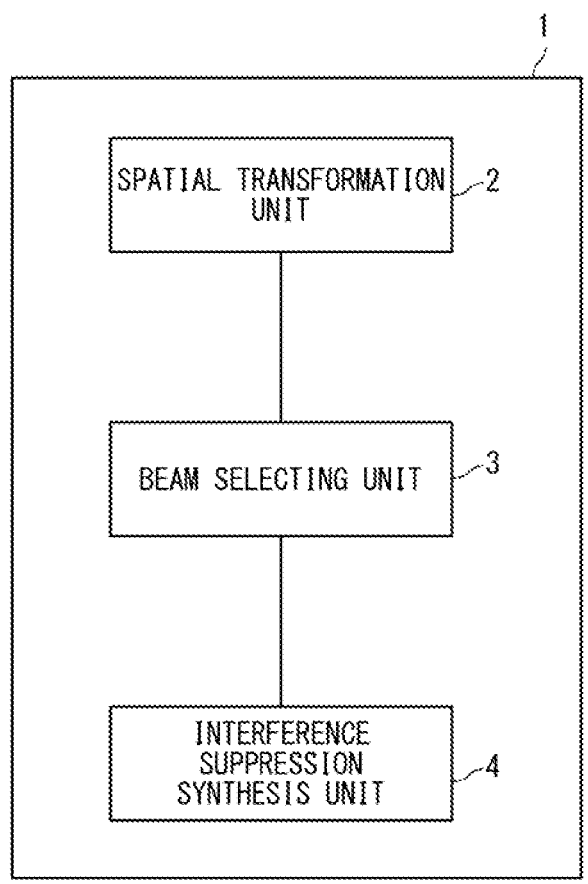
FIG. 1 shows an overview of a radio apparatus 1 according to an example embodiment of the present disclosure.

Example embodiments according to the present disclosure will be described hereinafter with reference to the drawings. Note that the following description and the drawings are omitted and simplified as appropriate for clarifying the explanation. Further, the same elements are denoted by the same reference numerals throughout the below-described drawings, and redundant descriptions thereof are omitted as required.
(Overview of Example Embodiment)

Prior to describing an example embodiment according to the present disclosure, an overview of an example embodiment will be described. FIG. 1 shows an overview of a radio apparatus 1 according to an example embodiment of the present disclosure.

The radio apparatus 1 includes a spatial transformation unit 2, a beam selecting unit 3, and an interference suppression synthesis unit 4.

The spatial transformation unit 2 performs a spatial transformation on a received signal including a desired signal and an interference signal received by a plurality of antennas, and thereby calculates a first beam-space received signal vector.

The beam selecting unit 3 selects at least two elements from the first beam-space received signal vector calculated by the spatial transformation unit 2 and generates a second beam-space received signal vector.

The interference suppression synthesis unit 4 estimates a covariance matrix of an interference noise signal including a noise signal and the interference signal included in the second beam-space received signal vector generated by the beam selecting unit 3. The interference suppression synthesis unit 4 generates a reception weight by using the estimated covariance matrix, and detects the desired signal based on the generated reception weight and the second beam-space received signal vector generated by the beam selecting unit 3.

As described above, the beam selecting unit 3 selects at least two elements from the first beam-space received signal vector calculated by the spatial transformation unit 2 and generates a second beam-space received signal vector. Then the interference suppression synthesis unit 4 estimates a covariance matrix of an interference noise signal by using the second beam-space received signal vector generated by the beam selecting unit 3, and generates a reception weight by using this covariance matrix. The interference suppression synthesis unit 4 detects a desired signal from the received signal based on the generated reception weight and the second beam-space received signal vector. That is, the radio apparatus 1 according to the example embodiment detects the desired signal based on the second beam-space received signal vector whose elements are selected from the first beam-space received signal vector and which has the number of dimensions smaller than that of the first beam-space received signal vector. Therefore, it is possible to reduce the amount of calculation required to suppress an interference signal by using the radio apparatus 1 according to the example embodiment.

First Example Embodiment

An example embodiment according to the present disclosure will be described hereinafter with reference to the drawings.
<Example of Configuration of Radio Communication System>

Figure 2:
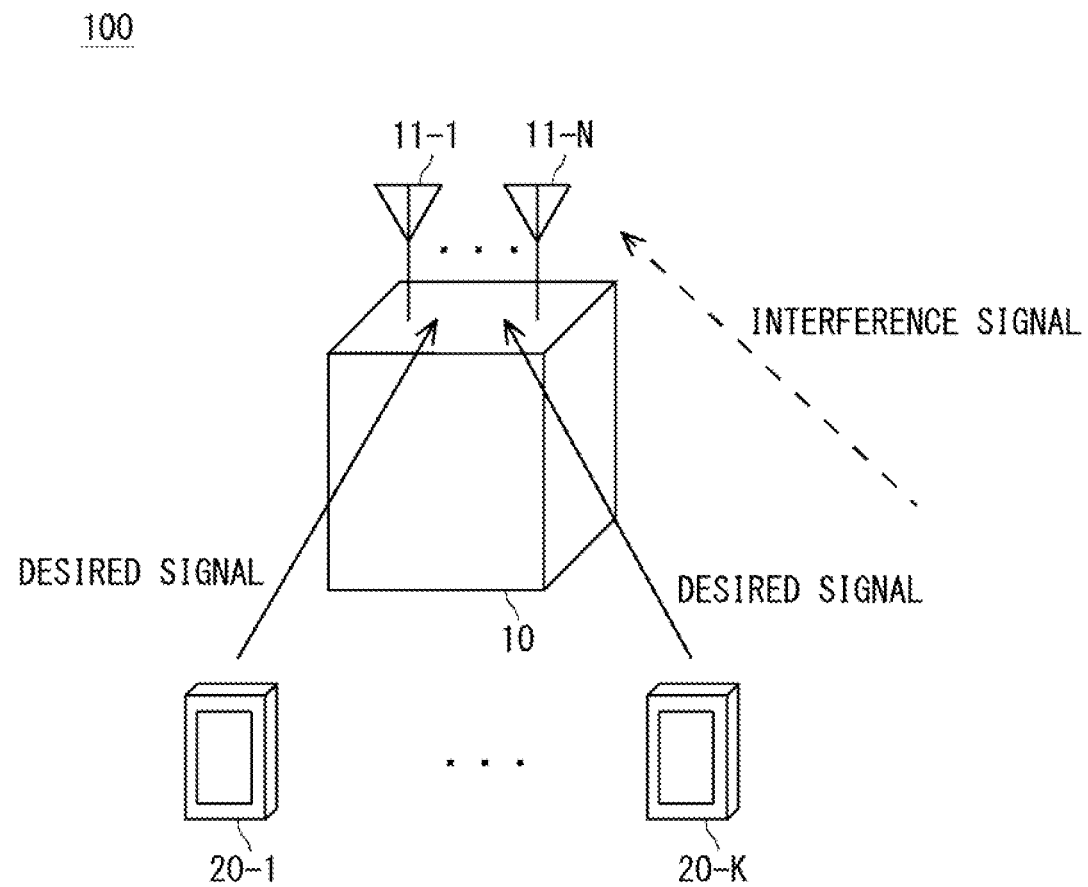
FIG. 2 shows an example of a configuration of a radio communication system according to a first example embodiment.

Firstly, an example of a configuration of a radio communication system 100 according to a first example embodiment will be described with reference to FIG. 2. FIG. 2 shows an example of a configuration of a radio communication system according to the first example embodiment. As shown in FIG. 2, the radio communication system 100 includes a radio apparatus 10 and radio terminals 20-1 to 20-K (K: an integer equal to or larger than one). Note that, in the following description, when the radio terminals 20-1 to 20-K are not distinguished from each other, they may be simply referred to as "the radio terminal(s) 20".

The radio apparatus 10 may be, for example, a base station or an access point. The radio apparatus 10 may be an NR NodeB (NR NB) or a gNodeB (gNB). Alternatively, the radio apparatus 10 may be an eNodeB (evolved Node B or eNB).

As shown in FIG. 2, the radio apparatus 10 includes a plurality of antennas 11-1 to 11-N (N is an integer equal to or larger than two). The radio apparatus 10 connects to and communicates with the radio terminals 20 through each of the plurality of antennas 11-1 to 11-N. Each of the plurality of antennas 11-1 to 11-N receives a signal from the radio terminals 20. Since the radio terminal 20 transmits a signal to the radio apparatus 10 while regarding the radio apparatus 10 as an entity with which the radio terminal 20 communicates, the signal transmitted from the radio terminal 20 may be referred to as a desired signal. In FIG. 2, arrows drawn by solid lines indicate desired signals transmitted from the radio terminals 20.

Further, each of the plurality of antennas 11-1 to 11-N receives a signal(s) from other radio terminals (not shown) which communicate with other radio apparatus (not shown) as an interference signal(s). That is, the radio apparatus 10 receives a reception signal including a desired signal transmitted from the radio terminal 20 and an interference signal transmitted from other radio terminals (not shown). In FIG. 2, an arrow drawn by a dotted line indicates an interference signal.

Note that, in the following description, when the antennas 11-1 to 11-N are not distinguished from each other, they may be simply referred to as "the antenna(s) 11". Further, although FIG. 2 shows that the radio apparatus 10 receives one interference signal, the radio apparatus 10 may receive a plurality of interference signals. Further, in the following description, a desired signal may be simply referred to as a signal.

The radio terminal 20 may be, for example, a mobile station, a UE (User Equipment), a WTRU (Wireless Transmit/Receive Unit), or a relay apparatus having a relaying function. The radio terminal 20 connects to and communicates with the radio apparatus 10.

<Example of Configuration of Radio Apparatus>

Figure 3:
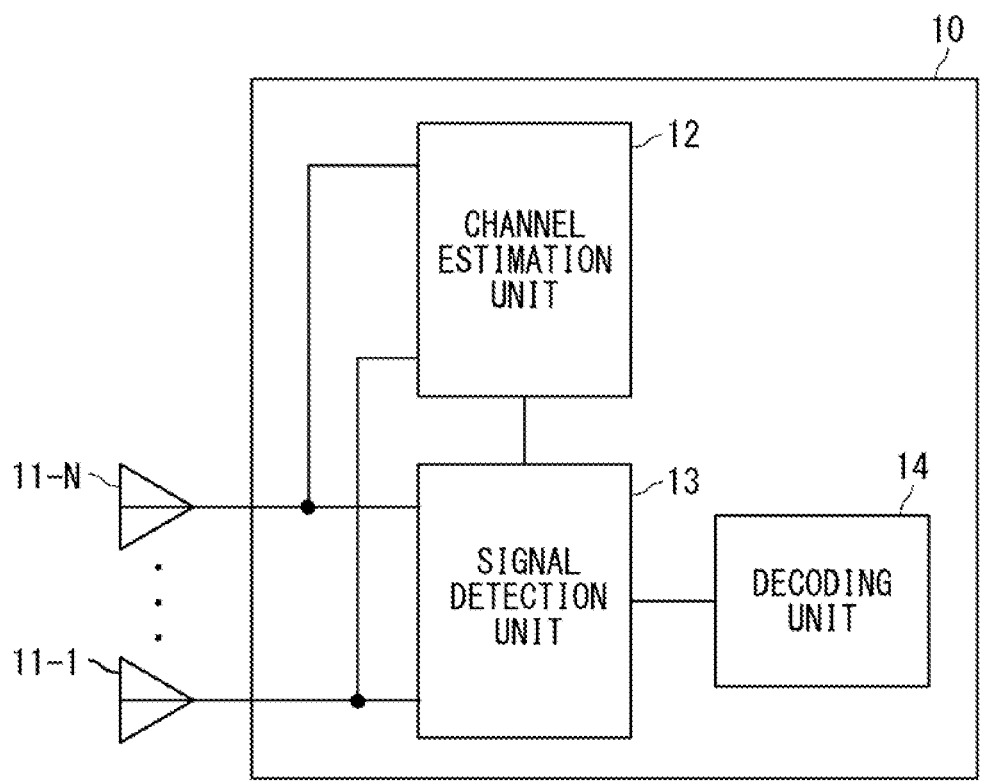
FIG. 3 shows an example of a configuration of a radio apparatus according to the first example embodiment.

Next, an example of a configuration of the radio apparatus 10 according to the first example embodiment will be described with reference to FIG. 3. FIG. 3 shows an example of a configuration of a radio apparatus according to the first example embodiment. The radio apparatus 10 includes antennas 11, a channel estimation unit 12, a signal detection unit 13, and a decoding unit 14.

The antenna 11 receives a reception signal including a desired signal transmitted by the radio terminal 20 and an interference signal. Each of the antennas 11-1 to 11-N is connected to the channel estimation unit 12 and the signal detection unit 13. The antennas 11 output the received signal to the channel estimation unit 12 and the signal detection unit 13.

Note that the radio apparatus 10 includes, between the antennas 11 and the channel estimation unit 12 and the signal detection unit 13, a transformation unit that converts a radio signal received by the antennas 11 into a baseband signal. Since the transformation unit is not directly related to the present disclosure, the description thereof is omitted in the present disclosure. Further, depending on the radio communication method, it is necessary to remove a CP (Cyclic Prefix), perform an FFT (Fast Fourier Transform), and so on between the antennas 11 and the channel estimator 12 and the signal detector 13. Therefore, the radio apparatus 10 may further include an execution unit (an execution module) that removes a CP, perform an FFT, and so on. Note that since the execution unit (the execution module) is not directly related to the present disclosure, the drawing and the description thereof are omitted.

The channel estimation unit 12 estimates a channel response between the radio apparatus 10 and the radio terminal 20 by using the received signal received from the antennas 11 and a reference signal that is transmitted from the radio terminal 20 and is known in the radio apparatus 10. The channel estimation unit 12 outputs the result of the estimation of the channel response to the signal detection unit 13.

Note that the result of the estimation of the channel response output from the channel estimation unit 12 to the signal detection unit 13 may be an estimated value of a channel response for each of the antennas 11-1 to 11-N or an estimated value of a channel response for each spatially-transformed beam. Further, when it is possible to estimate a channel response to the interference signal, the channel estimation unit 12 may output the estimated value of the channel response to the interference signal to the signal detection unit 13.

The signal detection unit 13 detects a signal, which the radio terminal 20 has transmitted while suppressing an interference signal, by using the received signal received from the antennas 11 and the estimated value of the channel response received from the channel estimation unit 12, and outputs the result of the detection to the decoding unit 14.

Note that depending on the radio communication method, it is necessary to perform calculation for an IDFT (Inverse Discrete Fourier Transform), an LLR (Log Likelihood Ratio), and the like between the signal detection unit 13 and the decoding unit 14. Therefore, the radio apparatus 10 may further include a calculation unit that calculates an IDFT, an LLR, and the like. Note that since the calculation unit is not directly related to the present disclosure, the drawing and the description thereof are omitted.

The decoding unit 14 decodes data transmitted from the radio terminal 20 by using the result of the detection of the signal transmitted by the radio terminal 20, which has been input from the signal detection unit 13 to the decoding unit 14.

<Example of Configuration of Signal Detection Unit>

Figure 4:
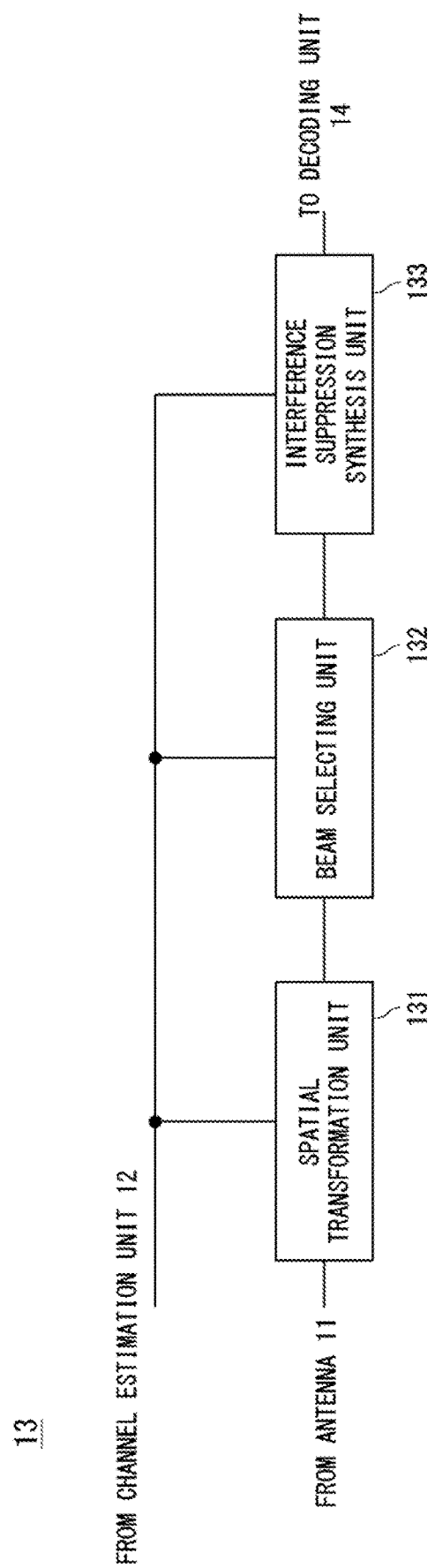
FIG. 4 shows an example of a configuration of a signal detection unit according to the first example embodiment.

Next, details of the signal detection unit 13 according to the first example embodiment will be described with reference to FIG. 4. FIG. 4 shows an example of a configuration of a signal detection unit according to the first example embodiment. The signal detection unit 13 includes a spatial transformation unit 131, a beam selecting unit 132, and an interference suppression synthesis unit 133.

The spatial transformation unit 131 corresponds to the spatial transformation unit 2 according to the overview of the example embodiment. The spatial transformation unit 131 performs a spatial transformation on a received signal received from the antennas 11 and thereby converts it into a signal in a beam space. The spatial transformation unit 131 calculates a beam-space received signal vector indicating the transformed signal and outputs the calculated beam-space received signal vector to the beam selecting unit 132.

Note that, as shown in FIG. 4, the spatial transformation unit 131 is also connected to the channel estimation unit 12, and therefore the spatial transformation unit 131 may use the estimated value of the channel response received from the channel estimation unit 12 for the spatial transformation. That is, the spatial transformation unit 131 may perform the spatial transformation based on the estimated value of the channel response of the desired signal received from the channel estimation unit 12.

The beam selecting unit 132 corresponds to the beam selecting unit 3 according to the overview of the example embodiment. The beam selecting unit 132 selects at least two beams by using the received signal in the beam space received from the spatial transformation unit 131 and the estimated value of the channel response received from the channel estimation unit 12. The beam selecting unit 132 outputs the result of the beam selection and the received signal in the beam space corresponding to the selected beams to the interference suppression synthesis unit 133.

Specifically, the beam selecting unit 132 selects at least two elements from among the elements of the beam-space received signal vector calculated by the spatial transformation unit 131, and generates a beam-space received signal vector by using the selected elements.

Note that the beam selecting unit 132 may select at least two beams without using the estimated value of the channel response received from the channel estimation unit 12.

The interference suppression synthesis unit 133 corresponds to the interference suppression synthesis unit 4 according to the overview of the example embodiment. The interference suppression synthesis unit 133 detects a signal, which the radio terminal 20 has transmitted while suppressing an interference signal, by using the beam-space received signal for the selected beams received from the beam selecting unit 132 and the estimated value of the channel response received from the channel estimation unit 12. The interference suppression synthesis unit 133 outputs the result of the detection to the decoding unit 14.

Specifically, the interference suppression synthesis unit 133 estimates a covariance matrix of an interference noise signal including a noise signal and an interference signal included in the beam-space received signal vector generated by the beam selecting unit 132. The interference suppression synthesis unit 133 generates a reception weight by using the estimated covariance matrix, and detects a desired signal transmitted by the radio terminal 20 based on the generated reception weight and the beam-space received signal vector generated by the beam selecting unit 132.

<Example of Operation of Signal Detection Unit>

Figure 5:
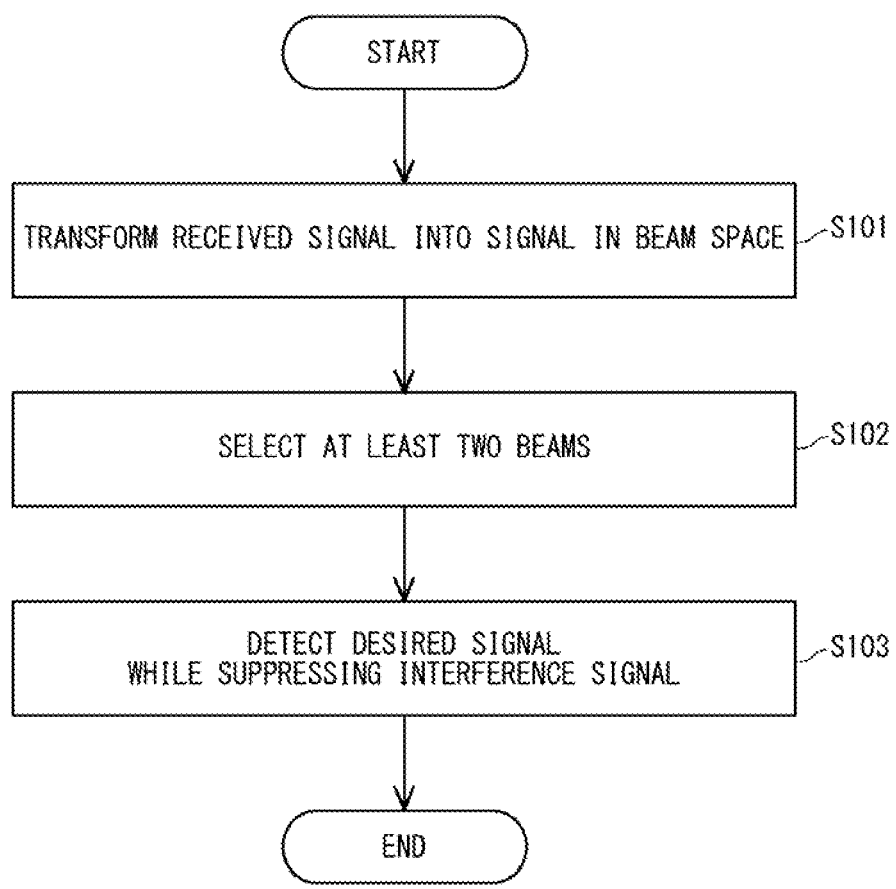
FIG. 5 is a flowchart showing an example of operations performed by the signal detection unit according to the first example embodiment.

Next, an example of operations performed by the signal detection unit 13 will be described with reference to FIG. 5. FIG. 5 is a flowchart showing an example of operations performed by a signal detection unit according to the first example embodiment.

Firstly, the spatial transformation unit 131 transforms an antenna-space received signal vector having a received signal for each of the antennas 11-1 to 11-N as a respective element into a vector in a beam space, and thereby calculates a beam-space received signal vector (step S101).

The spatial transformation unit 131 may use, for example, a discrete Fourier transform (DFT: Discrete Fourier Transform) as the spatial transformation into the beam space. Alternatively, the spatial transformation unit 131 may use a fast Fourier transform (FFT: Fast Fourier Transform), instead of using the DFT, as the spatial transformation.

Further, when the FFT is used, the spatial transformation unit 131 may combine padding values with the antenna-space received signal vector so that the number of dimensions of the antenna-space received signal vector becomes equal to a power of 2. The spatial transformation unit 131 may use 0 (zero) as the padding values.

When the DFT or the FFT is used as the spatial transformation, the spatial transformation unit 131 may use a plurality of DFT matrixes having different beam directions as spatial-transformation weights. The plurality of DFT matrixes are a plurality of transformation weight matrixes. That is, the spatial transformation unit 131 may use a plurality of transformation weight matrixes in the spatial transformation.

It is possible to generate a DFT matrix in which the beam direction is shifted by adding offset values smaller than one to values corresponding to beam numbers of coefficients in the DFT matrix. For example, when the number of DFT matrixes is represented by Q, an N-dimensional spatial transformation weight vector corresponding to a bth beam (0≤b≤N−1) of a qth DFT matrix (0≤q≤Q−1) can be expressed by the below-shown Expression (1).

[Expression 1]

$$a_{q,b}^T = \frac{1}{\sqrt{N}}\left[e^{j2\pi\cdot\frac{b+q/Q}{N}\cdot 0} \quad \cdots \quad e^{j2\pi\cdot\frac{b+q/Q}{N}\cdot(N-1)}\right] \quad (1)$$

where $^T$ represents a transposition, and q/Q ("/" represents a division in Expression (1)) on the right side in the Expression (1) is an offset value for shifting the beam direction. Further, in the Expression (1), "e" is the base of natural logarithms (Napier's number), and "j" is an imaginary unit.

The spatial transformation unit 131 may select one arbitrary DFT matrix from among the plurality of DFT matrixes and use the selected DFT matrix for the spatial transformation. Alternatively, the spatial transformation unit 131 may select a DFT matrix so that the number of beams for which the reception signal power or the magnitude of the channel response is equal to or larger than a predetermined threshold is minimized. Alternatively, the spatial transformation unit 131 may select a DFT matrix including a beam of which the received power or the magnitude of the channel response is the largest.

Note that the channel estimation unit 12 may select a DFT matrix and transmit the selected DFT matrix to the spatial transformation unit 131 as the result of the selection.

In the case where the antennas 11 are arranged in a planar array, the spatial transformation unit 131 may use a 2D (two-dimensional) DFT or a 2D FFT as the spatial transformation. When the antennas 11 are composed of two orthogonal polarizations, the spatial transformation unit 131 may independently perform a spatial transformation for each of the two polarizations.

Further, the spatial transformation unit 131 may multiply the received signal by a window function before performing the spatial transformation. That is, the spatial transformation unit 131 may multiply the received signal received in the antennas 11 by a window function, and perform a spatial transformation on the received signal. The window function may be, for example, a triangular window, a Hanning window, a Humming window, a Blackman window, or the like.

Next, the beam selecting unit 132 selects at least two elements from the beam-space received signal vector received from the spatial transformation unit 131 (step S102). The beam selecting unit 132 outputs the result of the beam selection and a beam-space received signal vector having the received signals of the selected beams as its elements to the interference suppression synthesis unit 133.

The beam selecting unit 132 uses the estimated value of the channel response received from the channel estimation unit 12 for the beam selection. For example, the beam selecting unit 132 may select beams for which the magnitude of the channel response in the beam space is equal to or larger than a predetermined threshold, or may select a predetermined number of beams in descending order of the magnitude of the channel response. Alternatively, the beam selecting unit 132 may select, at maximum, a predetermined number of beams for which the magnitude of the channel response is equal to or larger than a predetermined threshold.

Note that when the estimated value of the channel response received from the channel estimation unit 12 corresponds to a channel response in the antenna space, the beam selecting unit 132 performs a spatial transformation on the estimated value of the channel response received from the channel estimation unit 12. Then, the beam selecting unit 132 may calculate an estimated value of the channel response in the beam space.

In the case where the radio terminal 20 spatially multiplexes a plurality of signals and transmits the spatially-multiplexed signals, the beam selecting unit 132 may select beams for each of the spatially-multiplexed signals and use the sum of sets of the selection results as a final beam selection result.

The beam selecting unit 132 may select beams without using the estimated value of the channel response received from the channel estimation unit 12. In this case, for example, the beam selecting unit 132 may select beams for which the power of the received signal is equal to or higher than a predetermined threshold, or may select a predetermined number of beams in descending order of the power of the received signal. Alternatively, the beam selecting unit 132 may select, at maximum, a predetermined number of beams for which the power of the received signal is equal to or higher than a predetermined threshold.

In the case where the spatial transformation unit 131 uses a plurality of DFT matrixes, the beam selecting unit 132 may select beams from only one DFT matrix in order to prevent the number of selected beams from becoming too large or in order to prevent the directions of the selected beams from being unevenly distributed only in a specific range(s). This one DFT matrix may be, for example, a DFT matrix with which the number of beams for which the power of the received signal or the magnitude of the channel response is equal to or larger than a predetermined threshold is minimized. Alternatively, the aforementioned one DFT matrix may be a DFT matrix corresponding to a beam for which the power of the received signal or the magnitude of the channel response is the largest.

Lastly, the interference suppression synthesis unit 133 detects a desired signal, which the radio terminal 20 has transmitted while suppressing an interference signal, by using the estimated value of the channel response received from the channel estimation unit 12 (step S103).

Specifically, the interference suppression synthesis unit 133 calculates (estimates) a covariance matrix of an interference noise signal in which an interference signal and a noise signal are added (a covariance matrix of the sum of an interference signal and a noise signal). The interference suppression synthesis unit 133 generates a reception weight by using the calculated covariance matrix. The interference suppression synthesis unit 133 detects the desired signal, which the radio terminal 20 has transmitted while suppressing the interference signal, by multiplying the beam-space received signal for the selected beams received from the beam selecting unit 132 by the generated reception weight.

Note that when the estimated value of the channel response received from the channel estimation unit 12 corresponds to the antenna space, the interference suppression synthesis unit 133 performs a spatial transformation on the estimated value of the channel response received from the channel estimation unit 12. Then, the interference suppression synthesis unit 133 may calculate the estimated value of the channel response for the beams selected by the beam selecting unit 132.

The detection operation that the interference suppression synthesis unit 133 performs in order to detect a desired signal in the step S103 will be described hereinafter by using mathematical expressions. Note that in order to simplify the explanation, the following description will be given on the assumption that each of the radio terminals 20-1 to 20-K transmits one signal. However, the present invention can also be applied to cases where each of the radio terminals 20-1 to 20-K transmits a plurality of signals.

Note that a signal transmitted by a radio terminal 20-$k$ (k: an integer between 1 and K) is represented by $s_k$, and a K-dimensional transmission signal vector having transmission signals of the radio terminals 20-1 to 20-K as respective elements is represented by s. That is, it is expressed as $s^T=(s_1 \ldots s_K)$. Further, the number of beams selected by the beam selecting unit 132 is represented by M (M: an integer equal to or larger than two), and an M-dimensional channel response vector having estimated values of the channel responses of the radio terminal 20-$k$ for the selected beams as elements is represented by $h_k$. A (M×K)-dimensional channel response matrix having an M-dimensional channel response vector of each of the radio terminals 20 in a respective column vector is represented by H. That is, it is expressed as $H=(h_1 \ldots h_K)$. When an M-dimensional received signal vector having the received signals of the selected beams as elements is represented by y, the result of the detection of the K-dimensional transmission signal vector s in the interference suppression synthesis unit 133 can be expressed by the below-shown Expression (2). Note that y corresponds to the second beam-space received signal vector in the overview of the example embodiment.

[Expression 2]

$$\hat{s}=H^H R^{-1} y \qquad (2)$$

where $^H$ represents a Hermitian transposition.

Further, an (M×M)-dimensional matrix R is calculated by the below-shown Expressions (3) and (4). Note that R is a covariance matrix of a received signal.

[Expression 3]

$$R = \sum_{k=1}^{K} P_k h_k h_k^H + E[\tilde{y}\tilde{y}^H] \qquad (3)$$

$$\tilde{y} = y_{RS} - \sum_{k=1}^{K} h_k s_{RS,k} \qquad (4)$$

where: $P_k$ represents the power of a signal transmitted by the radio terminal 20-$k$; $s_{RS,k}$ represents a reference signal transmitted by the radio terminal 20-$k$; and $y_{RS}$ represents an M-dimensional vector having received signals of beams that are selected when the radio terminal 20 transmits the reference signal as elements. E[ ] in the second term on the right side in the Expression (3) represents averaging in time-frequency resources at which the reference signal is received, and a covariance matrix of the sum of an interference signal and a noise signal (a covariance matrix of an interference noise signal) is calculated by this averaging. In other words, the second term on the right side in the Expression (3) represents a covariance matrix of an interference noise signal in which an interference signal and a noise signal are added. Note that the first term on the right side in the Expression (3) indicates a covariance matrix of a desired signal.

Note that in the above description, it is assumed that an estimated value of a channel response to an interference signal is not used. However, the present disclosure is not limited this example. In the case where an estimated value of a channel response to an interference signal is used, the interference suppression synthesis unit 133 may include an interference signal for which an estimated value of a channel response is obtained in the subtraction of the second term on the right side in the Expression (4) and in the sum total of the first term on the right side in the Expression (3).

As described above, the spatial transformation unit 131 transforms a received signal received in the antennas 11 into a signal in a beam space. The beam selecting unit 132 selects at least two elements from a beam-space received signal vector received from the spatial transformation unit 131. The interference suppression synthesis unit 133 suppresses an interference signal by multiplying the received signal of beams selected by the beam selecting unit 132 by a reception weight generated from a covariance matrix of the sum of an interference signal and a noise signal, and detects a desired signal. That is, the radio apparatus 10 according to the first example embodiment selects at least two beams from a received signal in a beam space and thereby limits (i.e., reduces) the number of beams. By doing so, the radio apparatus 10 reduces the number of dimensions of a matrix on which an inverse matrix calculation is performed in order to generate a reception weight, and thereby reduces the amount of calculation therefor. Therefore, it is possible to reduce the amount of calculation required to suppress an interference signal by using the radio apparatus 10 according to the first example embodiment.

Second Example Embodiment

Next, a second example embodiment will be described in detail with reference to the drawings. The second example embodiment is an improved example (i.e., a modified example) of the first example embodiment. In the second example embodiment, when the radio apparatus 10 detects a plurality of signals transmitted from the radio terminal 20 (i.e., a plurality of desired signals), it individually selects beams and suppresses an interference signal for each of the plurality of signals.

The fundamental configuration of a radio communication system 100 according to the second example embodiment is similar to that of the first example embodiment described above with reference to FIG. 2, and therefore the description thereof will be omitted.

Further, the radio apparatus 10 according to the second example embodiment has a configuration that is obtained by replacing the signal detection unit 13 of the radio apparatus 10 according to the first example embodiment shown in FIG. 3 by a signal detection unit 15. Further, the rest of the configuration of the radio apparatus 10 according to the second example embodiment is similar to that of the first example embodiment. Therefore, an example of a configuration of the signal detection unit 15 and an example of operations performed by the signal detection unit 15 will be described hereinafter.

<Example of Configuration of Signal Detection Unit>

Figure 6:
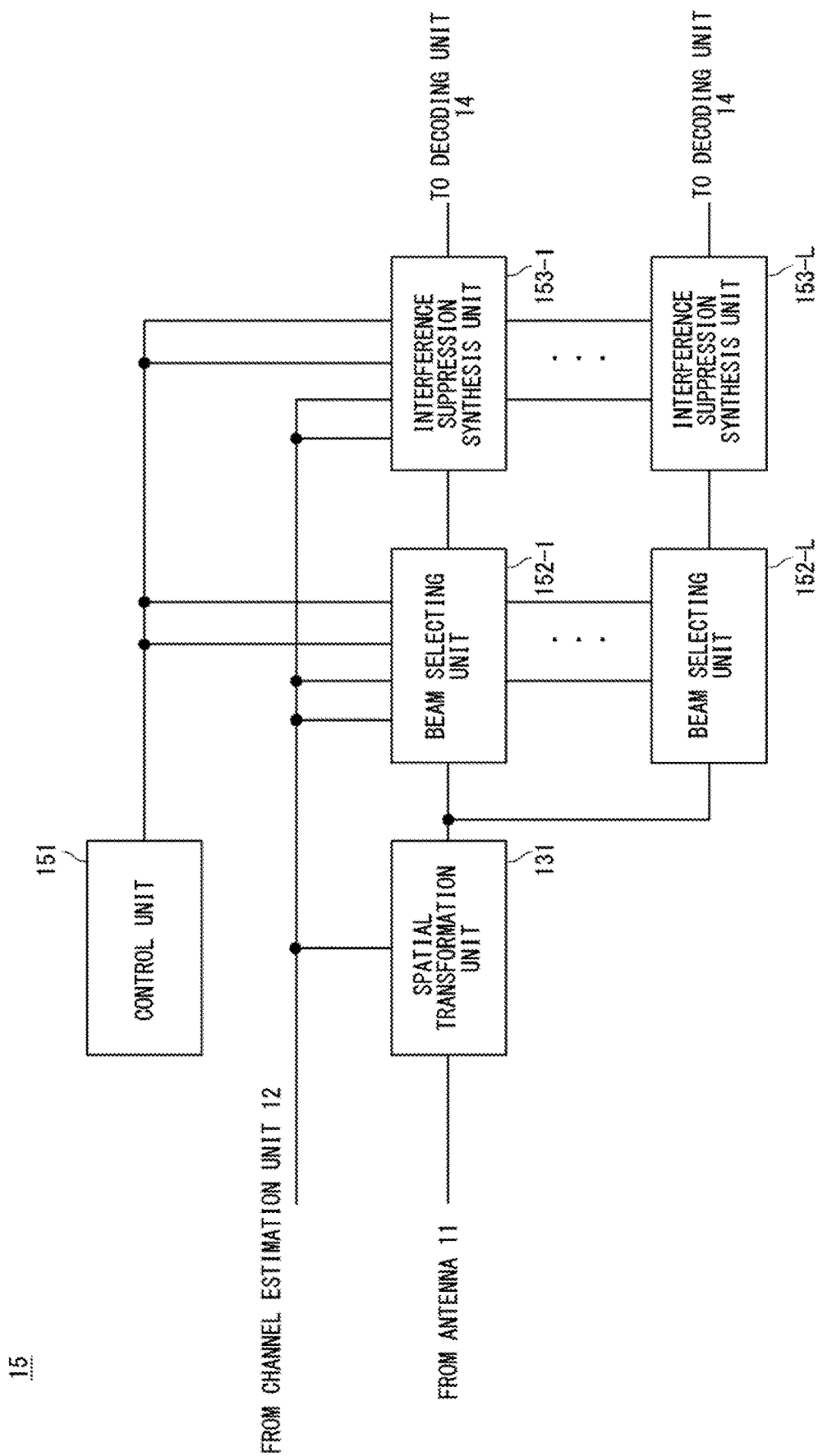
FIG. 6 shows an example of a configuration of a signal detection unit according to a second example embodiment.

An example of a configuration of the signal detection unit 15 according to the second example embodiment will be described with reference to FIG. 6. FIG. 6 shows an example of a configuration of a signal detection unit according to the second example embodiment. As shown in FIG. 6, the signal detection unit 15 is different from the signal detection unit 13 according to the first example embodiment shown in FIG. 4 because the signal detection unit 15 includes a control unit 151 and further includes a plurality of beam selecting units 152-1 to 152-L and a plurality of interference suppression synthesis units 153-1 to 153-L.

Note that L is an integer equal to or larger than two. That is, the signal detection unit 15 includes the spatial transformation unit 131, the control unit 151, the beam selecting units 152-1 to 152-L, and the interference suppression synthesis units 153-1 to 153-L.

The control unit 151 is connected to each of the beam selecting units 152-1 to 152-L. Further, the control unit 151 is connected to each of the interference suppression synthesis units 153-1 to 153-L.

The interference suppression synthesis units 153-1 to 153-L are provided so as to correspond to the beam selecting units 152-1 to 152-L, respectively. In other words, the interference suppression synthesis unit 153-1 is paired with the beam selecting unit 152-1 (i.e., they constitute a pair). Similarly, the interference suppression synthesis units 153-2 to 153-L are paired with the beam selecting units 152-2 to 152-L, respectively.

Note that, in the following description, when the beam selecting units 152-1 to 152-L are not distinguished from each other, they may be simply referred to as "the beam selecting unit(s) 152". When the interference suppression synthesis units 153-1 to 153-L are not distinguished from each other, they may be simply referred to as "the interference suppression synthesis unit(s) 153".

Since the spatial transformation unit 131 is similar to that in the first example embodiment, the description thereof will be omitted. The control unit 151 instructs each of the interference suppression synthesis units 153-1 to 153-L about a desired signal that should be detected by that interference suppression synthesis unit. Specifically, the control unit 151 instructs each of the beam selecting units 152 and each of the interference suppression synthesis units 153 as to which of a plurality of desired signals transmitted from the radio terminals 20 should be detected by them. In other words, the control unit 151 instructs each of the interference suppression synthesis units 153 and a respective one of the beam selecting units 152 that is paired with that interference suppression synthesis unit about a desired signal that should be detected by the interference suppression synthesis unit 153 of that pair.

Note that each of the beam selecting units 152 and a respective one of the interference suppression synthesis units 153 may detect one desired signal or may detect a plurality of desired signals. That is, the control unit 151 may determine that one desired signal should be detected, or may determine that a plurality of desired signals should be detected.

Further, the control unit 151 may instruct only the interference suppression synthesis unit 153 about the desired signal to be detected, or may instruct only the beam selecting unit 153 corresponding to the interference suppression synthesis unit 152 that should detect the desired signal to be detected about the desired signal to be detected. In this case, the interference suppression synthesis unit 153 or the beam selecting unit 152 which has been instructed by the control unit 151 notifies the corresponding beam selecting unit 152 or the interference suppression synthesis unit 153 of the instruction sent from the control unit 151 (i.e., transmits the instruction sent from the control unit 151 to the corresponding beam selecting unit 152 or the interference suppression synthesis unit 153).

Each of the beam selecting units 152-1 to 152-L selects beams suitable for detecting the desired signal instructed (i.e., indicated) by the control unit 151, and outputs the result of the beam selection and the received signal for the selected beams to the corresponding interference suppression synthesis unit among the interference suppression synthesis units 153-1 to 153-L.

Each of the interference suppression synthesis units 153-1 to 153-L detects the desired signal instructed by the control unit 151 while suppressing the interference signal, and outputs the result of the detection to the decoding unit 14.

<Example of Operation of Signal Detection Unit>

Figure 7:
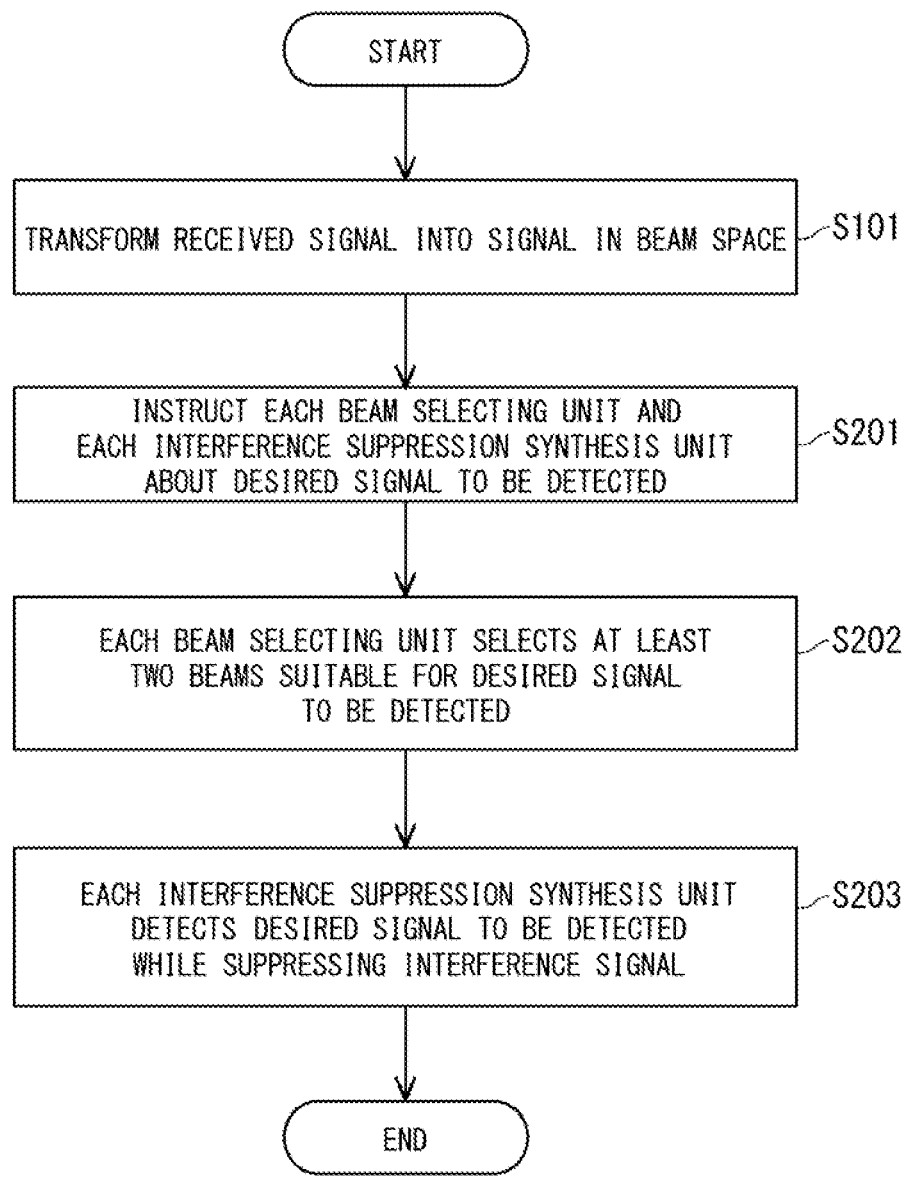
FIG. 7 is a flowchart showing an example of operations performed by the signal detection unit according to the second example embodiment.

Next, an example of operations performed by the signal detection unit 15 will be described with reference to FIG. 7. FIG. 7 is a flowchart showing an example of operations performed by a signal detection unit according to the second example embodiment. As shown in FIG. 7, the operations performed by the signal detection unit 15 differ from the example operations performed by the signal detection unit 13 according to the first example embodiment shown in FIG.

5 because the signal detection unit 15 performs a step S201 after the step S101. Further, the signal detection unit 15 performs a step S202 instead of performing the step S102 and performs a step S203 instead of performing the step S103.

Note that steps S202 and S203 are performed by each of the beam selecting units 152 and a respective one of the interference suppression synthesis units 152 corresponding to that beam selecting unit 153. That is, the steps S202 and S203 are performed by the beam selecting units 152-1 to 152-L and the interference suppression synthesis units 153-1 to 153-L.

Firstly, the spatial transformation unit 131 transforms received signals received in the antennas 11 into signals in a beam space (step S101). Note that the step S101 is similar to that in the first example embodiment, and therefore the detailed description thereof will be omitted.

Next, the control unit 151 instructs each of the beam selecting units 152 and a respective one of the interference suppression synthesis units 153 as to which of a plurality of desired signals transmitted from the radio terminals 20 should be detected by them (step S201).

Next, each of the beam selecting units 152-1 to 152-L selects at least two beams suitable for a signal to be detected instructed (i.e., indicated) by the control unit 151 from the beam-space received signal vector received from the spatial transformation unit 131 (step S202). Then, each of the beam selecting units 152-1 to 152-L outputs the result of the beam selection and a beam-space received signal vector having received signals of the selected beams as elements to a respective one of the interference suppression synthesis units 153-1 to 153-L.

Each of the beam selecting units 152-1 to 152-L selects beams by using the estimated value of the channel response received from the channel estimation unit 12. Each of the beam selecting units 152-1 to 152-L may select beams for which the magnitude of the channel response is equal to or larger than a predetermined threshold by using the channel response in the beam space for the signal to be detected, or may select a predetermined number of beams in descending order of the magnitude of the channel response. Alternatively, each of the beam selecting units 152-1 to 152-L may select, at maximum, a predetermined number of beams for which the magnitude of the channel response is equal to or larger than a predetermined threshold.

Next, each of the interference suppression synthesis units 153-1 to 153-L detects the desired signal to be detected instructed from the control unit 151 while suppressing the interference signal (step S203). Specifically, each of the interference suppression synthesis units 153-1 to 153-L calculates (estimates) a covariance matrix of the sum of an interference signal and a noise signal in the selected beams by using the estimated channel response received from the channel estimation unit 12. Each of the interference suppression synthesis units 153-1 to 153-L generates a reception weight from the calculated covariance matrix. Each of the interference suppression synthesis units 153-1 to 153-L multiplies the beam-space received signal for the beams selected by a respective one of the beam selecting units 152-1 to 152-L by the generated reception weight, and detects the desired signal instructed from the control unit 151 while suppressing the interference signal.

The detection operation that the interference suppression synthesis unit 153 performs in order to detect a desired signal in the step S203 will be described hereinafter by using mathematical expressions. In order to simplify the explanation, it is assumed that each of the radio terminals 20-1 to 20-K transmits one signal and each of the interference suppression synthesis units 153-1 to 153-L detects a respective signal. In this case, L is equal to K. Note that the present invention is not limited to this example and can also be applied to cases where at least one of the radio terminals 20-1 to 20-K transmits a plurality of signals.

Here, the interference suppression synthesis unit 153-$k$, which detects a signal transmitted by the radio terminal 20-$k$, is examined. The number of beams selected by the beam selecting unit 152-$k$ is represented by $M^{(k)}$, and the $M^{(k)}$-dimensional channel response vector having the estimated values of the channel response of the radio terminal 20-$i$ for the selected beams as elements is represented by h$_i$(k). Note that i is a natural number, and the radio terminal 20-$i$ represents a radio terminal having an arbitrary terminal number.

When the $M^{(k)}$-dimensional received signal vector having the received signals of the selected beams as elements is represented by $y^{(k)}$, the result of the detection of the signal transmitted from the radio terminal 20-$k$ in the interference suppression synthesis unit 153-$k$ can be expressed by the below-shown Expression (5).

[Expression 4]

$$\hat{s}_k = h_k^{(k)H} R^{(k)-1} y^{(k)} \tag{5}$$

where $^H$ represents a Hermitian transposition.

Further, a ($M^{(k)} \times M^{(k)}$)-dimensional matrix $R^{(k)}$ is calculated by the below-shown Expressions (6) and (7). Note that $R^{(k)}$ is a covariance matrix of a received signal.

[Expression 5]

$$R^{(k)} = \sum_{i=1}^{K} P_i h_i^{(k)} h_i^{(k)H} + E[\tilde{y}^{(k)} \tilde{y}^{(k)H}] \tag{6}$$

$$\tilde{y}^{(k)} = y_{RS}^{(k)} - \sum_{i=1}^{K} h_i^{(k)} s_{RS,i} \tag{7}$$

where $y_{RS}(k)$ represents an $M^{(k)}$-dimensional vector having, as its elements, received signals of the selected beams for the radio terminal 20-$k$ when the radio terminal 20 transmits a reference signal. Note that E[ ] in the second term on the right side in the Expression (6) represents averaging in time-frequency resources at which the reference signal is received, and a covariance matrix of the sum of an interference signal and a noise signal in the selected beams is calculated by this averaging. In other words, the second term on the right side in the Expression (6) represents a covariance matrix of an interference noise signal in which an interference signal and a noise signal are added. Note that the first term on the right side in the Expression (6) indicates a covariance matrix of a desired signal.

As described above, the radio apparatus 10 according to this example embodiment includes the plurality of beam selecting units 152-1 to 152-L and the plurality of interference suppression synthesis units 153-1 to 153-L. Each of the beam selecting units 152-1 to 152-L and a respective one of the interference suppression synthesis units 153-1 to 153-L are configured to detect one of a plurality of desired signals transmitted from the radio terminals 20 instructed (i.e., indicated) by the control unit 151. That is, each of the beam selecting units 152-1 to 152-L and a respective one of the interference suppression synthesis units 153-1 to 153-L individually select beams and suppress an interference signal for each of a plurality of desired signals transmitted from the radio terminals 20. Therefore, according to this example embodiment, the number of beams selected by each of the beam selecting units 152 becomes smaller than that of the radio apparatus 10 according to the first example embodiment, which performs a detection operation for a plurality of desired signals, and the number of dimensions of the matrix on which inverse matrix calculation is performed by each of the interference suppression synthesis units 153 becomes smaller than that of the radio apparatus 10 according to the first example embodiment. Therefore, by using the radio apparatus 10 according to the second example embodiment, it is possible to reduce the amount of calculation required to suppress an interference signal as compared to the case where the radio apparatus 10 according to the first example embodiment is used.

Third Example Embodiment

Next, a third example embodiment will be described in detail with reference to the drawings. The third example embodiment is an improved example (i.e., a modified example) of the second example embodiment. A radio apparatus 10 according to the third example embodiment individually performs a spatial transformation on each of a plurality of desired signals transmitted from the radio terminals 20.

The fundamental configuration of a radio communication system 100 according to the third example embodiment is similar to those of the first and second embodiments. Further, the radio apparatus 10 according to the third example embodiment has a configuration that is obtained by replacing the signal detection unit 15 of the radio apparatus 10 according to the second example embodiment by a signal detection unit 16. The configuration of the radio apparatus 10 according to the third example embodiment other than the configuration of the signal detection unit 16 is similar to those of the first and second example embodiments, and therefore the description thereof will be omitted. An example of a configuration of and an example of operations performed by the signal detection unit 16 of the radio apparatus 10 according to the third example embodiment will be described hereinafter.

<Example of Configuration of Signal Detection Unit>

Figure 8:
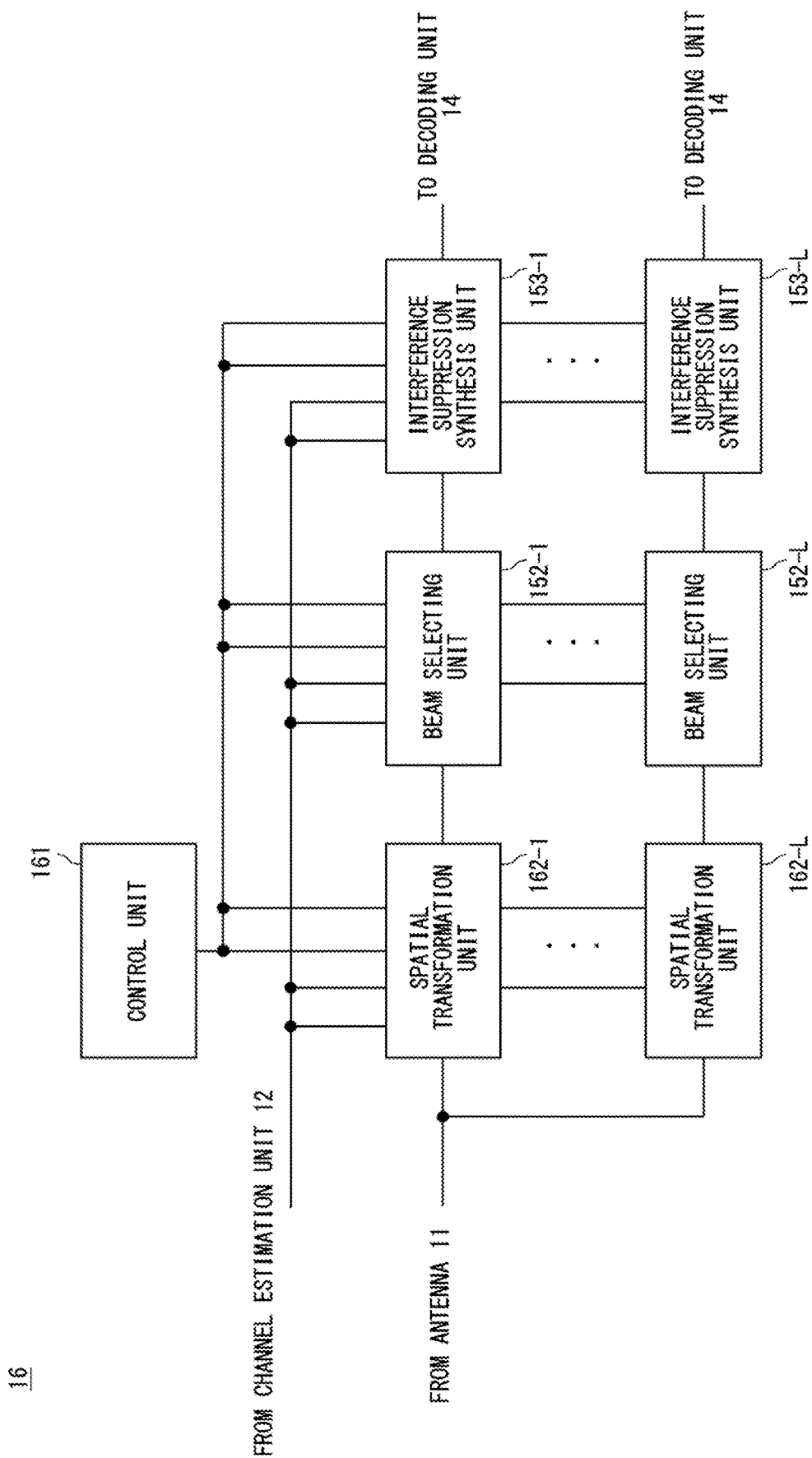
FIG. 8 shows an example of a configuration of a signal detection unit according to a third example embodiment.

An example of a configuration of the signal detection unit 16 according to the third example embodiment will be described with reference to FIG. 8. FIG. 8 shows an example of a configuration of a signal detection unit according to the third example embodiment. As shown in FIG. 8, the signal detection unit 16 is different from the signal detection unit 15 according to the second example embodiment shown in FIG. 6 because the control unit 151 is replaced by a control unit 161 and a plurality of spatial transformation units 162-1 to 162-L are provided in the signal detection unit 16. That is, the signal detection unit 16 includes the control unit 161, the spatial transformation units 162-1 to 162-L, the beam selecting units 152-1 to 152-L, and the interference suppression synthesis units 153-1 to 153-L.

The control unit 161 is connected to each of the spatial transformation units 162-1 to 162-L. The control unit 161 is connected to each of the beam selecting units 152-1 to 152-L. The control unit 161 is connected to each of the interference suppression synthesis units 153-1 to 153-L.

The spatial transformation units 162-1 to 162-L are provided so as to correspond to the beam selecting units 152-1 to 152-L, respectively. Further, the spatial transformation units 162-1 to 162-L are provided so as to correspond to the interference suppression synthesis units 153-1 to 153-L, respectively. In other words, the spatial transformation unit 162-1, the interference suppression synthesis unit 153-1, and the beam selecting unit 152-1 constitute a set. Similarly, each of the spatial transformation units 162-2 to 162-L, a respective one of the interference suppression synthesis units 153-2 to 153-L, and a respective one of the beam selecting units 152-2 to 152-L constitute a set.

Since the beam selecting unit 152 and the interference suppression synthesis unit 153 are similar to those of the second example embodiment, the descriptions thereof will be omitted. Further, in the following description, when the spatial transformation units 162-1 to 162-L are not distinguished from each other, they may be simply referred to as "the spatial transformation unit(s) 162".

The control unit 161 instructs each of the spatial transformation units 162, a respective one of the beam selecting units 152, and a respective one of the interference suppression synthesis units 153 as to which of a plurality of signals transmitted from the radio terminals 20 should be detected by them. In other words, the control unit 161 instructs each of the spatial transformation units 162, a respective one of the interference suppression synthesis units 153, and a respective one the beam selecting units 152, which constitute a set, about a desired signal that should be detected by the interference suppression synthesis unit 153 of that set.

Note that each of the spatial transformation units 162, a respective one of the interference suppression synthesis units 153, and a respective one the beam selecting units 152 may detect one desired signal or may detect a plurality of desired signals. That is, the control unit 161 may determine that one desired signal should be detected, or determine that a plurality of desired signals should be detected.

Further, the control unit 161 may instruct only the interference suppression synthesis unit 153 about the desired signal to be detected. Alternatively, the control unit 161 may instruct only the beam selecting unit 152 corresponding to the interference suppression synthesis unit 153 that should detect the desired signal to be detected about the desired signal to be detected. Alternatively, the control unit 161 may instruct only the special transformation unit 162 corresponding to the interference suppression synthesis unit 153 that should detect the desired signal to be detected about the desired signal to be detected. In this case, the functional unit that has received the instruction sent from the control unit 161 (the special transformation unit 162, the interference suppression synthesis unit 153, or the beam selecting unit 152) notifies the other corresponding functional units (the special transformation unit 162, the interference suppression synthesis unit 153, or the beam selecting unit 152) of the instruction sent from the control unit 161 (i.e., transmits the instruction sent from the control unit 161 to the other corresponding functional units).

Each of the spatial transformation units 162-1 to 162-L performs a spatial transformation for transforming a received signal received from the antennas 11 into a signal in a beam space, and outputs the calculated received signal in the beam space to a respective one of the beam selecting units 152-1 to 152-L.

<Example of Operation of Signal Detection Unit>

Figure 9:
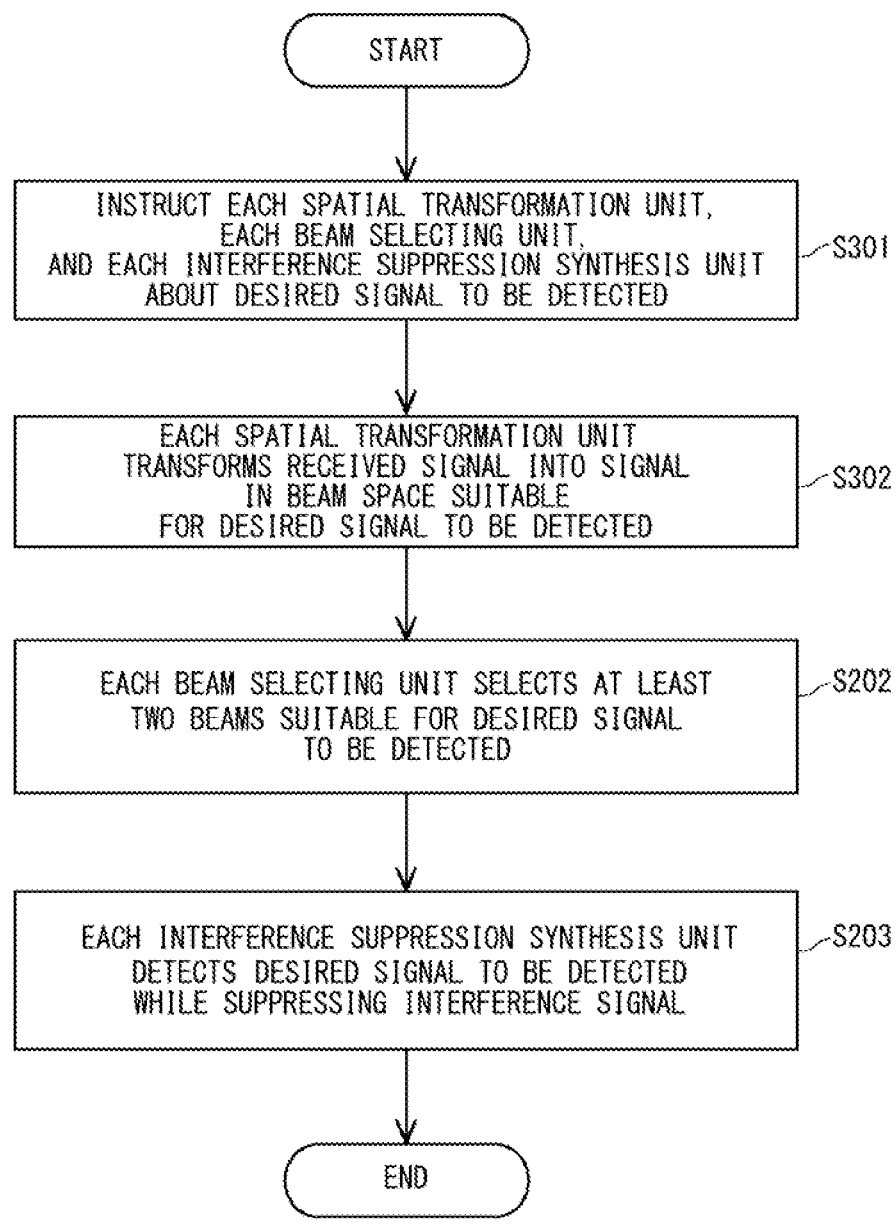
FIG. 9 is a flowchart showing an example of operations performed by the signal detection unit according to the third example embodiment.

Next, an example of operations performed by the signal detection unit 16 will be described with reference to FIG. 9. FIG. 9 is a flowchart showing an example of operations performed by a signal detection unit according to the third example embodiment. As shown in FIG. 9, the operations performed by the signal detection unit 16 differ from the example operations performed by the signal detection unit 15 according to the second example embodiment shown in FIG. 7 because the signal detection unit 16 performs a step S301 instead of performing the step S101 and performs a step S302 instead of performing the step S201. Note that since steps S202 and S203 are similar to those in the second example embodiment, detailed descriptions thereof will be omitted.

Firstly, the control unit 161 instructs each of the spatial transformation units 162, a respective one of the beam selecting units 152, and a respective one of the interference suppression synthesis units 153 as to which of a plurality of signals transmitted from the radio terminals 20 should be detected by them (step S301).

Next, each of the spatial transformation units 162-1 to 162-L transforms an antenna-space received signal vector having received signals for the antennas 11-1 to 11-N as respective elements into a vector in a beam space suitable for the signal to be detected instructed (i.e., indicated) from the control unit 161 (step S302). Each of the spatial transformation units 162-1 to 162-L performs the above-described transformation into the beam space and thereby calculates a beam-space received signal vector.

The spatial transformation unit 162 selects, for example, one DFT matrix suitable for the signal to be detected from among a plurality of DFT matrixes, and performs a spatial transformation into the beam space. For example, the spatial transformation unit 162 may select a DFT matrix so that the number of beams for which the magnitude of the channel response is equal to or larger than a predetermined threshold is minimized. In this way, it is possible to reduce the number of beams selected by the beam selecting unit 152, and thereby to reduce the amount of calculation performed by the interference suppression synthesis unit 153. Alternatively, the spatial transformation unit 162 may select a DFT matrix including a beam of which the received power or the magnitude of the channel response is the largest. In this way, it is possible to improve the quality of the signal input to the interference suppression synthesis unit 153, and thereby to improve the performance of the signal detection by the interference suppression synthesis unit 153. Note that the channel estimation unit 12 may select a DFT matrix as described above and transmit the selected DFT matrix to the spatial transformation unit 162 as the result of the selection.

When the step S302 is performed, each of beam selecting units 152-1 to 152-L performs the step S202, and lastly each of interference suppression synthesis units 153-1 to 153-L performs the step S203.

As described above, the radio apparatus 10 according to the third example embodiment has a configuration similar to those of the first and second embodiments, so that it can reduce the amount of calculation as in the case of the first and second embodiments.

Further, the radio apparatus 10 according to the third example embodiment performs a spatial transformation into a beam space in a form suitable for each of a plurality of signals transmitted from the radio terminals 20. Therefore, the radio apparatus 10 according to the third example embodiment can reduce the number of beams selected by the beam selecting unit 152 as compared to the radio apparatus 10 according to the second example embodiment, which performs a common spatial transformation for each of a plurality of signals. Alternatively, the radio apparatus 10 according to the third example embodiment can enhance (improve) the quality of the signal input to the interference suppression synthesis unit 153 as compared to the radio apparatus 10 according to the second example embodiment. Therefore, by using the radio apparatus 10 according to the third example embodiment, it is possible to further reduce the amount of calculation required to suppress an interference signal as compared to the case where the radio apparatus 10 according to the second example embodiment is used. Alternatively, by using the radio apparatus 10 according to the third example embodiment, it is possible to improve the performance of the signal detection as compared to the case where the radio apparatus 10 according to the second example embodiment is used.

Other Example Embodiment

Figure 10:
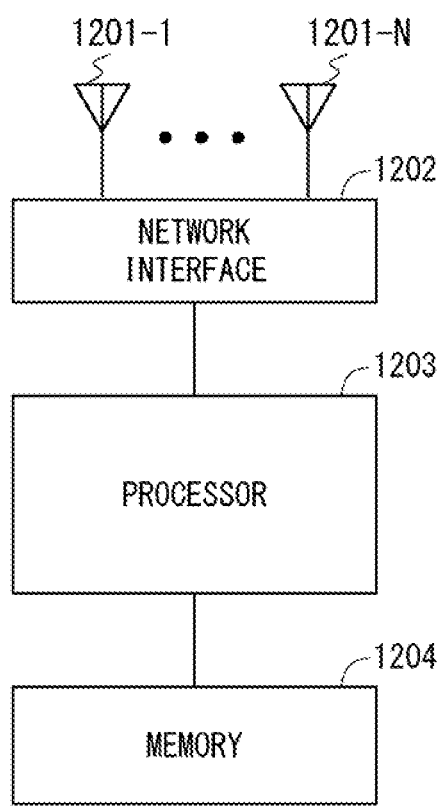
FIG. 10 is a block diagram showing an example of a hardware configuration of a computer (an information processing apparatus) capable of implementing a radio apparatus according to each example embodiment of the present disclosure.

The radio apparatus 1 and the radio apparatus 10 (hereinafter referred to as the radio apparatus 1 and the like) according to the above-described example embodiments may have the below-described hardware configuration. FIG. 10 is a block diagram showing an example of a hardware configuration of a computer (an information processing apparatus) capable of implementing a radio apparatus according to each example embodiment of the present disclosure.

As shown in FIG. 10, a radio apparatus 1 or the like includes a plurality of antennas 1201-1 to 1201-N, a network interface 1202, a processor 1203, and a memory 1204. The plurality of antennas 1201-1 to 1201-N and the network interface 1202 are used to communicate with other radio communication apparatuses including a radio terminal 20. The network interface 1202 may include, for example, a network interface card (NIC) in conformity with IEEE (Institute of Electrical and Electronics Engineers) 802.11 series, IEEE 802.3 series, or the like.

The processor 1203 may load software (a computer program) from the memory 1204 and execute the loaded software, thereby performing the processes of the radio apparatus 1 or the like described by using the flowchart in the above-described embodiments. The processor 1203 may be, for example, a microprocessor, an MPU (Micro Processing Unit), or a CPU (Central Processing Unit). The processor 1203 may include a plurality of processors.

The memory 1204 is formed by a combination of a volatile memory and a nonvolatile memory. The memory 1204 may include a storage located remotely from the processor 1203. In this case, the processor 1203 may access the memory 1204 through an I/O interface (not shown).

In the example shown in FIG. 10, the memory 1204 is used to store a group of software modules. The processor 1203 may load the group of software modules from the memory 1204 and execute the loaded software module, thereby performing the processes of the radio apparatus 1 or the like described in the above-described embodiments.

As described above with reference to FIG. 10, each of the processors included in the radio apparatus 1 or the like executes one or a plurality of programs including a group of instructions for causing a computer to perform the algorithm described above with reference to the drawings.

In the above-described examples, the program may be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory). These programs may be supplied to the computer by using various types of transitory computer readable media. Examples of the transitory computer readable media include an electrical signal, an optical signal, and an electromagnetic wave. The transitory computer readable media can be used to supply programs to the computer through a wired communication line (e.g., electric wires and optical fibers) or a radio communication line.

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices.

IoT devices may comprise automated equipment that follow software instructions stored in an internal memory.

IoT devices may operate without requiring human supervision or interaction. IoT devices might also remain stationary and/or inactive for a long period of time.

IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices.

It will be appreciated that a UE may support one or more IoT or MTC applications.

Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 1

| Service Area | MTC applications |
| --- | --- |
| Security | Surveillance systems |
|  | Backup for landline |
|  | Control of physical access (e.g. to buildings) |
|  | Car/driver security |

TABLE 1-continued

| Service Area | MTC applications |
| --- | --- |
| Tracking & Tracing | Fleet Management |
|  | Order Management |
|  | Pay as you drive |
|  | Asset Tracking |
|  | Navigation |
|  | Traffic information |
|  | Road tolling |
|  | Road traffic optimisation/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote | Sensors |
| Maintenance/Control | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

Note that the present disclosure is not limited to the above-described example embodiments, and they may be modified as appropriate without departing from the spirit of the present disclosure. Further, the present disclosure may be implemented by combining any two or more of the example embodiments as appropriate.

Further, the whole or part of the embodiments disclosed above can be described as, but not limited to, the following supplementary notes.

(Supplementary Note 1)

A radio apparatus comprising:

a spatial transformation unit configured to perform a spatial transformation on a received signal including a desired signal and an interference signal received by a plurality of antennas, and thereby calculate a first beam-space received signal vector;

a beam selecting unit configured to select at least two elements from the first beam-space received signal vector and generate a second beam-space received signal vector; and an interference suppression synthesis unit configured to estimate a covariance matrix of an interference noise signal including a noise signal and the interference signal included in the second beam-space received signal vector, generate a reception weight by using this covariance matrix, and detect the desired signal based on the reception weight and the second beam-space received signal vector.

(Supplementary Note 2)

The radio apparatus described in Supplementary note 1, wherein the spatial transformation unit performs the spatial transformation by using a discrete Fourier transform or a fast Fourier transform.

(Supplementary Note 3)

The radio apparatus described in Supplementary note 2, wherein the spatial transformation unit makes the number of dimensions of the first beam-space received signal vector equal to a power of two by combining a padding value with the first beam-space received signal vector.

(Supplementary Note 4)

The radio apparatus described in any one of Supplementary notes 1 to 3, wherein the spatial transformation unit performs the spatial transformation by using a plurality of transformation weight matrixes.

(Supplementary Note 5)

The radio apparatus described in any one of Supplementary notes 1 to 4, wherein the plurality of antennas includes two orthogonal polarizations, and the spatial transformation unit independently performs the spatial transformation for each of the two polarizations.

(Supplementary Note 6)

The radio apparatus described in any one of Supplementary notes 1 to 5, wherein the spatial transformation unit performs the spatial transformation based on an estimated value of a channel response to the desired signal.

(Supplementary Note 7)

The radio apparatus described in any one of Supplementary notes 1 to 6, wherein the beam selecting unit selects the at least two elements based on an estimated value of a channel response to the desired signal.

(Supplementary Note 8)

The radio apparatus described in any one of Supplementary notes 1 to 7, wherein the radio apparatus comprises a plurality of interference suppression synthesis units, and a plurality of beam selecting units provided so as to correspond to the plurality of interference suppression synthesis units, respectively, the radio apparatus further comprises a control unit configured to instruct at least one of the interference suppression synthesis unit and the beam selecting unit corresponding to that interference suppression synthesis unit about a desired signal that should be detected by that interference suppression synthesis unit, and each of the interference suppression synthesis units detects a desired signal instructed from the control unit.

(Supplementary Note 9)

The radio apparatus described in Supplementary note 8, further comprising a plurality of spatial transformation units provided so as to correspond to the plurality of beam selecting units, respectively, wherein the control unit instructs at least one of each of the interference suppression synthesis units, a beam selecting unit corresponding to that interference suppression synthesis unit, and the spatial transformation unit corresponding to that beam selecting unit about a desired signal that should be detected by that interference suppression synthesis unit.

(Supplementary Note 10)

The radio apparatus described in any one of Supplementary notes 1 to 9, wherein the spatial transformation unit multiplies the received signal by a window function and performs the spatial transformation on the received signal which has been multiplied by the window function.

(Supplementary Note 11)

The radio apparatus described in Supplementary note 10, wherein the window function is one of a triangular window, a Hanning window, a Hamming window, and a Blackman window.

(Supplementary Note 12)

A signal detection method comprising:

performing a spatial transformation on a received signal including a desired signal and an interference signal received by a plurality of antennas, and thereby calculating a first beam-space received signal vector;

selecting at least two elements from the first beam-space received signal vector and generating a second beam-space received signal vector; and estimating a covariance matrix of an interference noise signal including a noise signal and the interference signal included in the second beam-space received signal vector, generating a reception weight by using this covariance matrix, and detecting the desired signal based on the reception weight and the second beam-space received signal vector.

(Supplementary Note 13)

A signal detection program for causing a computer to:

perform a spatial transformation on a received signal including a desired signal and an interference signal received by a plurality of antennas, and thereby calculate a first beam-space received signal vector;

select at least two elements from the first beam-space received signal vector and generate a second beam-space received signal vector; and estimate a covariance matrix of an interference noise signal including a noise signal and the interference signal included in the second beam-space received signal vector, generate a reception weight by using this covariance matrix, and detect the desired signal based on the reception weight and the second beam-space received signal vector.

(Supplementary Note 14)

A radio communication system comprising a radio terminal and a radio apparatus, wherein the radio apparatus comprises:

a spatial transformation unit configured to perform a spatial transformation on a received signal received from the radio terminal and thereby calculate a first beam-space received signal vector, the received signal including a desired signal and an interference signal received by a plurality of antennas;

a beam selecting unit configured to select at least two elements from the first beam-space received signal vector and generate a second beam-space received signal vector; and an interference suppression synthesis unit configured to estimate a covariance matrix of an interference noise signal including a noise signal and the interference signal included in the second beam-space received signal vector, generate a reception weight by using this covariance matrix, and detect the desired signal based on the reception weight and the second beam-space received signal vector.

(Supplementary Note 15)

The radio communication system described in Supplementary note 14, wherein the spatial transformation unit performs the spatial transformation by using a discrete Fourier transform or a fast Fourier transform.

This application is based upon and claims the benefit of priority from Japanese patent application No. 2018-193192, filed on Oct. 12, 2018, the disclosure of which is incorporated herein in its entirety by reference.

REFERENCE SIGNS LIST 1, 10 RADIO APPARATUS
2 SPATIAL TRANSFORMATION UNIT
3 BEAM SELECTION UNIT
4 INTERFERENCE SUPPRESSION SYNTHESIS UNIT
11, 11-1 to 11-N ANTENNA
12 CHANNEL ESTIMATION UNIT
13 SIGNAL DETECTION UNIT
14 DECODING UNIT
20, 20-1 to 20-K RADIO TERMINALS
100 RADIO COMMUNICATION SYSTEM
131, 162-1 to 162-L SPATIAL TRANSFORMATION UNIT
132, 152-1 to 152-L BEAM SELECTION UNIT
133, 153-1 to 153-L INTERFERENCE SUPPRESSION SYNTHESIS UNIT
151, 161 CONTROL UNIT

What is claimed is:

1. A radio apparatus comprising:
   at least one memory, and
   at least one processor configured to implement:
   a spatial transformation unit configured to perform a spatial transformation on a received signal including a desired signal and an interference signal received by a plurality of antennas, and thereby calculate a first beam-space received signal vector;
   a beam selecting unit configured to select at least two elements from the first beam-space received signal vector and generate a second beam-space received signal vector using the at least two elements; and
   an interference suppression synthesis unit configured to estimate a covariance matrix of an interference noise signal including a noise signal and the interference signal included in the second beam-space received signal vector, generate a reception weight by using this covariance matrix, and detect the desired signal based on the reception weight and the second beam-space received signal vector.

2. The radio apparatus according to claim 1, wherein the spatial transformation unit is configured to perform the spatial transformation by using a discrete Fourier transform or a fast Fourier transform.

3. The radio apparatus according to claim 2, wherein the spatial transformation unit is configured to make the number of dimensions of the first beam-space received signal vector equal to a power of two by combining a padding value with the first beam-space received signal vector.

4. The radio apparatus according to claim 1, wherein the spatial transformation unit is configured to perform the spatial transformation by using a plurality of transformation weight matrixes.

5. The radio apparatus according to claim 1, wherein
   a polarization of each of the plurality of antennas is either of two orthogonal polarizations, and the spatial transformation unit is configured to perform the spatial transformation for each of the two polarizations independently.

6. The radio apparatus according to claim 1, wherein the spatial transformation unit is configured to perform the spatial transformation based on an estimated value of a channel response to the desired signal.

7. The radio apparatus according to claim 1, wherein the beam selecting unit is configured to select the at least two elements based on an estimated value of a channel response to the desired signal.

8. The radio apparatus according to claim 1,
wherein the at least one processor is configured to implement:
a plurality of interference suppression synthesis units, and a plurality of beam selecting units provided so as to correspond to the plurality of interference suppression synthesis units, respectively; and
a control unit configured to instruct at least one of the interference suppression synthesis unit and the beam selecting unit corresponding to that interference suppression synthesis unit about a desired signal that should be detected by that interference suppression synthesis unit, and
wherein each of the interference suppression synthesis units is configured to detect a desired signal instructed from the control unit.

9. The radio apparatus according to claim 8,
wherein the at least one processor is configured to implement a plurality of spatial transformation units provided so as to correspond to the plurality of beam selecting units, respectively, and
wherein the control unit is configured to instruct at least one of each of the interference suppression synthesis units, a beam selecting means corresponding to that interference suppression synthesis unit, and the spatial transformation unit corresponding to that beam selecting unit about a desired signal that should be detected by that interference suppression synthesis unit.

10. The radio apparatus according to claim 1, wherein the spatial transformation unit is configured to multiply the received signal by a window function and perform the spatial transformation on the received signal which has been multiplied by the window function.

11. The radio apparatus according to claim 10, wherein the window function is one of a triangular window, a Hanning window, a Hamming window, and a Blackman window.

12. A signal detection method comprising:
performing a spatial transformation on a received signal including a desired signal and an interference signal received by a plurality of antennas, and thereby calculating a first beam-space received signal vector;
selecting at least two elements from the first beam-space received signal vector and generating a second beam-space received signal vector using the at least two elements; and
estimating a covariance matrix of an interference noise signal including a noise signal and the interference signal included in the second beam-space received signal vector, generating a reception weight by using this covariance matrix, and detecting the desired signal based on the reception weight and the second beam-space received signal vector.

13. A non-transitory computer readable medium storing a signal detection program for causing a computer to:
perform a spatial transformation on a received signal including a desired signal and an interference signal received by a plurality of antennas, and thereby calculate a first beam-space received signal vector;
select at least two elements from the first beam-space received signal vector and generate a second beam-space received signal vector using the at least two elements; and
estimate a covariance matrix of an interference noise signal including a noise signal and the interference signal included in the second beam-space received signal vector, generate a reception weight by using this covariance matrix, and detect the desired signal based on the reception weight and the second beam-space received signal vector.

* * * * *